United States Patent [19]
Okumura et al.

[11] Patent Number: 5,431,456
[45] Date of Patent: Jul. 11, 1995

[54] PIPE FITTING

[75] Inventors: Masahiko Okumura; Noriyuki Moritani; Kazuki Nakamichi, all of Kyoto, Japan

[73] Assignee: Sekisui Kagaku Kogyo Kabushiki Kaisha, Osaka, Japan

[21] Appl. No.: 266,342

[22] Filed: Jul. 1, 1994

[30] Foreign Application Priority Data

Jul. 30, 1993 [JP] Japan .................. 5-189772

[51] Int. Cl.6 ............................................. F16L 41/00
[52] U.S. Cl. ...................... 285/156; 285/179; 285/322; 285/330; 285/331; 285/369; 285/423; 285/906
[58] Field of Search ............... 285/331, 322, 323, 55, 285/156, 179, 330, 369, 423, 906

[56] References Cited

U.S. PATENT DOCUMENTS

| | | | |
|---|---|---|---|
| 3,843,169 | 10/1974 | Wise | 285/322 X |
| 4,676,532 | 6/1987 | Gronau | 265/423 X |
| 4,941,693 | 7/1990 | Spaude et al. | 285/331 |
| 5,186,500 | 2/1993 | Folkers | 285/55 |

FOREIGN PATENT DOCUMENTS

| | | |
|---|---|---|
| 0166385 | 1/1986 | European Pat. Off. |
| 0222199 | 5/1987 | European Pat. Off. |
| 3-112617 | 5/1991 | Japan . |
| 4175595 | 6/1992 | Japan ............ 285/323 |
| 4-262189 | 9/1992 | Japan . |

OTHER PUBLICATIONS

Database WPI, Week 9138, Derwent Publications Ltd., London, GB AN: 91-278236.
Database WPI, Week 9226, Derwent Publications Ltd., London, GB AN: 92-214369.
Patent Abstracts of Japan, vol. 17, No. 43(M-1360) Jan. 27, 1993.

*Primary Examiner*—Dave W. Arola
*Attorney, Agent, or Firm*—Kanesaka & Takeuchi

[57] ABSTRACT

A pipe fitting or coupling is used for connecting at least two pipes. The pipe fitting is basically formed of a coupling main body and a slit ring integrally formed together. The coupling main body is formed of an inner layer of good heat resisting property, an intermediate layer containing glass fibers, and an outer layer having large tensile elongation and impact strength. The slit ring is formed at an edge portion of the outer circumferential surface of the coupling main body.

6 Claims, 5 Drawing Sheets

PIPE FITTING

BACKGROUND OF THE INVENTION AND RELATED ART STATEMENT

The present invention relates to a pipe fitting or coupling for connecting pipes, such as water supply pipes, hot-water supply pipes and the like.

As a prior art, a pipe fitting or coupling for connecting pipes, such as water supply pipes and hot-water supply pipes, is formed of a cylindrical coupling main body and a slit ring provided on an outer circumferential surface of an edge portion of the coupling main body. The edge portion of the coupling main body is inserted into an interior of an edge portion of a pipe to be connected, and a nut, such as a cap nut, is screwed onto a screw portion provided on the slit ring to be tightened, thereby to hold and fix the edge portion of the pipe with the coupling main body and the slit ring.

For example, Japanese Patent Laid-Open Publication (KOKAI) No. 4-262189 discloses a pipe coupling formed of an inner layer for constituting an inner circumferential surface of a coupling main body, an outer layer for constituting an outer circumference surface of the coupling main body, and a slit ring. The inner layer is made of a thermoplastic resin having a heat distortion temperature of 95° C. or higher, such as polyether ether ketone, cross-linking polyethylene and polyphenylene sulfide. The outer layer includes a screw portion on one edge thereof and is made of a thermoplastic resin having a screw torque strength of 300 kg/cm$^2$ or higher, such as polyether imide, polyphenylene sulfide and polyether sulfone. The slit ring is made of a thermoplastic resin, such as nylon and polyethylene having ductility, so that when a nut is screwed onto the slit ring, the diameter of the slit ring is contracted. The inner layer and the outer layer of the coupling main body, and the slit ring are integrally formed.

However, the pipe coupling disclosed in the above publication is short of shear strength in the screw portion formed on the edge portion of the outer layer or a tip portion of the slit ring of the coupling main body, so that a thermoplastic resin to which reinforcing glass fibers are added has been often used.

Although a modulus of shear elasticity, i.e. shear strength in the screw portion, is improved by the thermoplastic resin containing the glass fibers, impact strength is decreased. Therefore, when pipes are connected, if a pipe coupling is dropped, or tools fall down onto the pipe coupling, the pipe coupling may crack or break. Also, depending on a installation condition of a pipe coupling, the pipe coupling is stepped by people or subjected to shocks after installation, so that the same accident or trouble as mentioned above may take place.

The present invention has been made to obviate the above drawbacks of the prior art.

Accordingly, one object of the invention is to provide a pipe fitting or coupling having excellent heat and chemical resisting properties as well as excellent pressure resisting strength, shear strength and impact strength in screw portions formed on an outer circumferential surface of a coupling main body and a slit ring.

Another object of the invention is to provide the pipe fitting or coupling as stated above, wherein the coupling main body and the slit ring are formed integrally so that the pipe coupling can be easily connected to a pipe and handled easily.

A further object of the invention is to provide the pipe fitting or coupling as stated above, wherein the pipe coupling can be easily and economically manufactured.

Further objects and advantages of the invention will be apparent from the following description of the invention.

SUMMARY OF THE INVENTION

A pipe fitting or coupling of the present invention is basically formed of a cylindrical coupling main body, and a slit ring integrally formed on an outer edge of the coupling main body and having a screw portion thereon. The coupling main body is formed of three layers, i.e. inner, intermediate and outer layers. The inner layer constitutes an inner circumferential surface of the pipe coupling, and the outer layer constitutes an outer circumferential surface of the coupling main body. The intermediate layer is situated between the inner and outer layers.

The inner layer is formed of a thermoplastic resin containing polyether ether ketone as a main component, and the intermediate layer is formed of a thermoplastic resin containing reinforcing fibers. The outer layer is formed of a thermoplastic resin with a tensile elongation of 10 to 1,000% and Izod impact value of 50 to 1,000 J.m$^{-1}$.

In the present invention, the thermoplastic resin containing polyether ether ketone as the main component for the inner layer has preferably a melting point of 300° C. or higher and a melt viscosity of 1,000 to 10,000 poise (380° C. a shearing speed of 1,000 sec$^{-1}$). If the melt viscosity is 1,000 poise or lower, a heat resisting property and mechanical strength of the resin become low, while if the melt viscosity is 10,000 poise or higher, good fluidity of the resin can not be obtained so that formation of a product becomes difficult.

In the present invention, preferably, the thermoplastic resin to be used for the intermediate layer must have good adhesion property with the resins for the inner and outer layers, as well as excellent rigidity and heat resisting property. Examples of such a resin include polyamide, polyethylene, polypropylene, polybutylene terephthalate, polyvinyl chloride, polyacetals, polycarbonate, polyether sulfone, polyphenylene oxide, polyphenylene sulfide, polysulfone and polyether imide. Among these resins, especially, polyether imide, polysulfone, polyether sulfone and polyphenylene sulfide are preferable.

As reinforcing fibers to be added to the thermoplastic resin for the intermediate layer, inorganic fibers, such as glass fibers, carbon fibers, boron fibers, silicon carbide fibers, alumina fibers, magnesium silicate fibers, titanium based fibers and carbon based fibers, and organic fibers, such as Alamide (tradename) fibers are used.

A preferable amount of the reinforcing fibers to be added to the intermediate layer is 5 to 50% by weight. When the reinforcing fibers are added in an amount of 5% by weight or less, an improvement of modulus of shear elasticity can not be obtained, while with an amount of 50% by weight or more of the fibers, fluidity of the resulting resin is impaired, so that formation of a product becomes difficult.

In the present invention, as the thermoplastic resin for the outer layer having tensile elongation of 10 to 1,000% and Izod impact value of 50 to 1,000 J.m$^{-1}$, a polyamide resin, such as nylon, a polyolefin resin, such as polyethylene and polypropylene, and a polyacetal resin are used. Especially, the polyamide resin is preferable. Incidentally, the tensile elongation and the Izod impact value are obtained by tests according to tensile elongation of ASTM D638 and Izod impact value of ASTM D256 (with notch).

In the present invention, in general, the pipe fitting or coupling including the inner layer, the intermediate layer and the outer layer is integrally formed such that a resin for the inner layer is injected into a mold for forming the inner layer, and the formed inner layer is inserted into a mold for the intermediate layer. Then, a resin for the intermediate layer is injected outside the inner layer to form a product having the inner layer and the intermediate layer. The thus formed product is inserted into a mold for the outer layer and the slit ring, and a resin for the outer layer and the slit ring is injected outside thereof, so that the pipe coupling can be obtained. The pipe coupling may be formed in the order of forming the intermediate layer, inner layer and outer layer, or the order of the outer layer, intermediate layer and inner layer.

Also, the pipe coupling of the present invention may be formed such that three cavities for the inner layer, the intermediate layer and the outer layer are set in clamping posts of a rotary type clamping device, and one core is transferred in the order to the respective clamping posts, thereby to form the inner layer, the intermediate layer and the outer layer.

The pipe coupling of the present invention is formed of the inner, intermediate and outer layers integrally formed together. The inner layer directly contacting fluid is formed of the thermoplastic resin containing polyether ether ketone as the main component having an excellent heat resisting property. The intermediate layer provided on the outer circumference of the inner layer is formed of the thermoplastic resin containing the reinforcing fibers of high mechanical strength and rigidity. The outer layer provided on the outer circumference of the intermediate layer and the slit ring and/or a screw portion formed on the outer circumferential edge thereof is formed of the thermoplastic resin of high elongation and impact strength.

Thus, even if high temperature fluid, such as hot water, flows in the pipe coupling, blisters and thermal deformation hardly occur on the layers. Further, the pipe coupling of the present invention has excellent chemical stability and resistance against pressure of the fluid, so that cracks, breaks and deformation due to impact and twisting imparted thereto do not occur easily.

Also, in the pipe coupling of the present invention, the coupling main body and the slit ring are formed integrally. Thus, when the pipe coupling is connected to a pipe, a separate slit ring is not required to be fitted thereon, and the pipe coupling can be easily stored and transported.

DETAILED DESCRIPTION OF PREFERRED EMBODIMENTS

Figure 1:
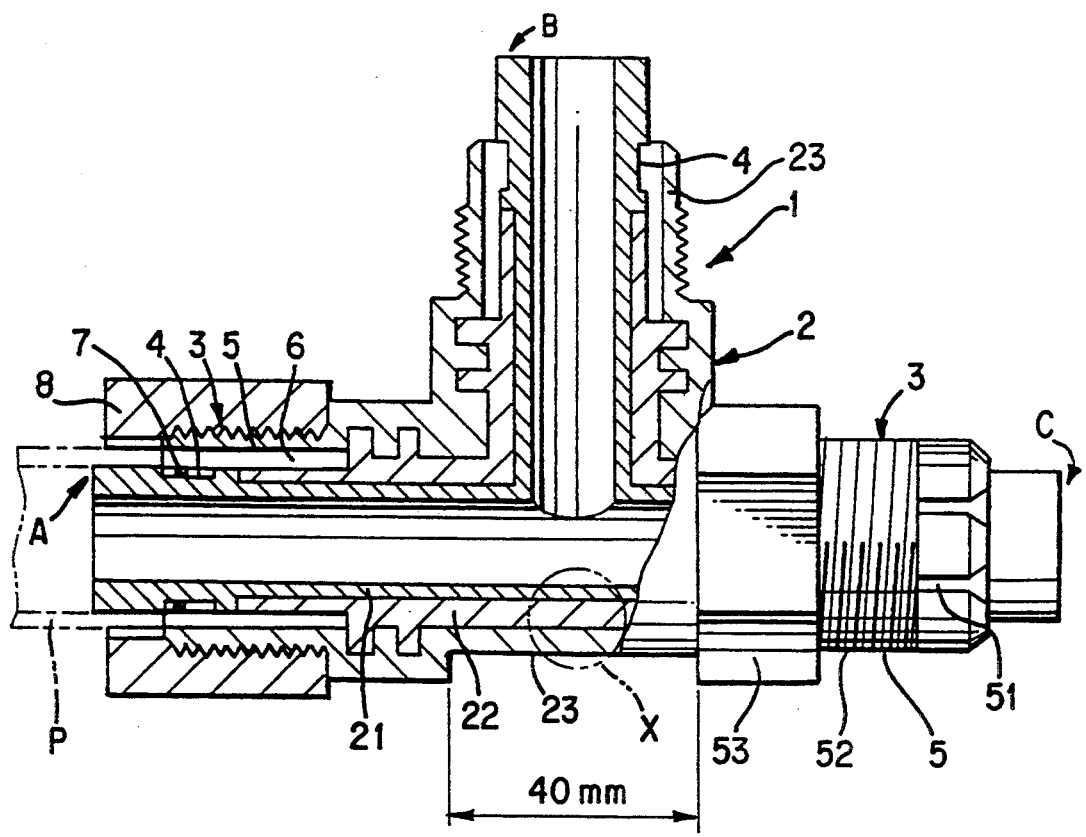
FIG. 1 is a partially cut side view for showing a first embodiment of a pipe coupling of the present invention.

Referring to FIG. 1, a first embodiment of a pipe fitting or coupling 1 of the invention is shown. The coupling 1 includes a coupling main body 2 having three connecting portions 3 with connecting edges, i.e. edge A, edge B and edge C, arranged in a T-shape.

The coupling main body 2 is formed substantially in a cylindrical form and is arranged in a T-shape. The main body 2 is formed of an inner layer 21 contacting a fluid, an intermediate layer 22 provided along an outer circumference of the inner layer 21, and an outer layer 23 disposed along an outer circumference of the intermediate layer 22. In each connecting portion 3 to be connected to a pipe P, the intermediate layer 22 is not formed, and an inserting portion 6 for the pipe P is formed between the inner layer 21 and the outer layer 23 outside the intermediate layer 22. Thus, the inner layer 21 is exposed in the inserting portion 6 and provided with a circular groove 4 therearound.

In each connecting portion 3, the outer layer 23 has a hexagonal portion 53 to be engaged with a wrench and forms a slit ring 5. Each slit ring 5 is provided with a plurality of slits 51 extending in an axial direction of the connecting portion 3 at the tip thereof, and external threads 52 on the outer surface.

The inner layer 21 is formed of a thermoplastic resin containing polyether ether ketone as a main component, which has a good heat resisting property. The intermediate layer 22 is formed of a thermoplastic resin having good adhesion property with respect to the thermoplastic resin of the inner layer 21 and a thermoplastic resin of the outer layer 23. The intermediate layer contains reinforcing fibers of a high heat resisting property, mechanical strength and rigidity. The outer layer 23 is formed of the thermoplastic resin having tensile elongation of 10 to 1,000%, Izod impact strength value of 50 to 1,000 $J.m^{-1}$ and good shear strength and impact strength. The inner layer 21, intermediate layer 22 and outer layer 23 are formed integrally by an injection molding.

When the coupling 1 and the pipe P are connected together, an elastic packing 7 is fitted into the annular groove 4, and an edge portion of the pipe P is inserted into the inserting portion 6. A nut 8, such as a cap nut, is fitted over the external threads 52 of the slit ring 5, and is tightened. Accordingly, the diameter of the slit ring 5 is reduced, and the edge portion of the pipe P is deformed, while the elastic packing 7 is pressed against an inner surface of the pipe P, thereby to firmly hold the pipe P and at the same time, to seal tightly.

Figure 2:
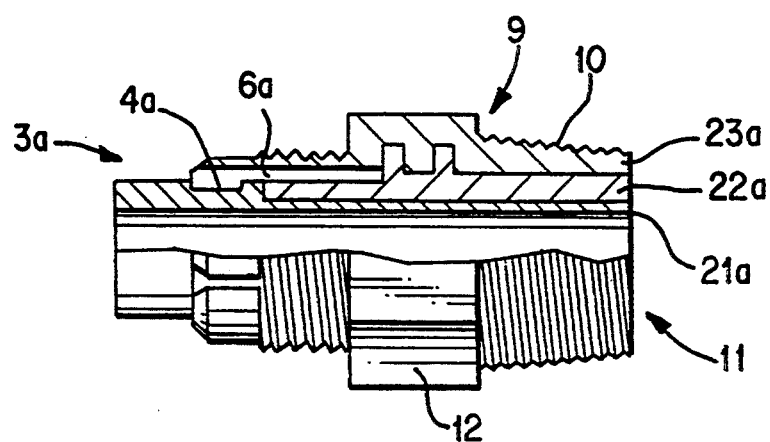
FIG. 2 is a partially cut side view for showing a second embodiment of a male adaptor type pipe coupling of the present invention.
Figure 3:
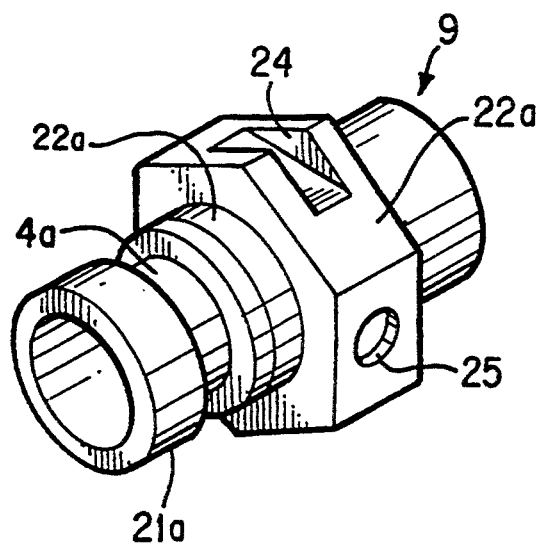
FIG. 3 is a perspective view of a part of the second embodiment as shown in FIG. 2.

Referring to FIGS. 2 and 3, a second embodiment 9 in the form of a male adapter of the invention is shown. FIG. 2 shows a partly cut side view, and FIG. 3 shows a perspective view for showing the adapter 9 without an outer layer.

The male adapter 9 is formed of an inner layer 21a, an intermediate layer 22a and an outer layer 23a as in the coupling 1 of the first embodiment shown in FIG. 1. The materials of the inner, intermediate and outer layers of the adapter 9 are the same as in the coupling 1 as shown in FIG. 1. Also, a connecting portion 3a to be connected to a pipe is provided at a left side of the male adapter 9 and is formed as in the connecting portion 3 of the coupling 1. However, a valve connection portion 11 with external threads 10 is formed at a right side of the adapter 9. A middle portion 12 has a hexagonal shape to be engaged with a wrench.

As shown in FIG. 3, the intermediate layer 22a has a hexagonal shape with slits 24 and concaves 25 in a middle portion thereof. When the outer layer 23a is formed, the outer layer 23a is filled in the slits 24 and the concaves 25, while an insertion portion 6a and a groove 4a are formed between the inner and outer layers 21a, 23a. Accordingly, when the middle portion 12 is held by the wrench after the adapter 9 is completed, the outer layer 23a does not slip relative to the intermediate layer 22a.

The male adapter 9 operates as in the coupling 1. Incidentally, the slits 24 and the concaves 25 may be formed in the intermediate layer 22 of the coupling 1, as shown in FIG. 1.

Figure 4:
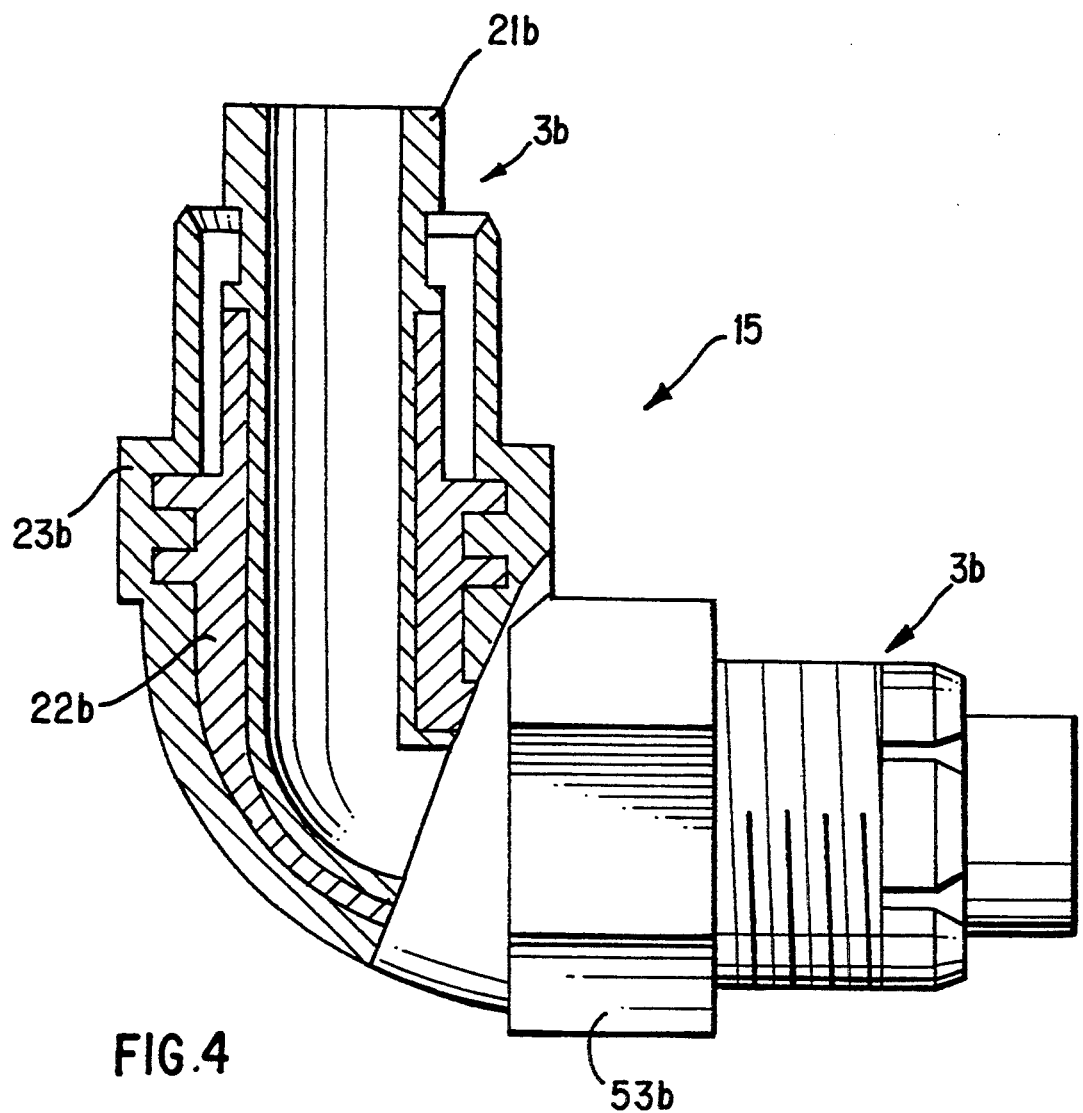
FIG. 4 is a partially cut side view for showing a third embodiment of an elbow type pipe coupling of the present invention.

FIG. 4 shows an elbow type pipe coupling 15 having two connecting portions 3b arranged perpendicularly. The coupling 15 is formed of an inner layer 21b, an intermediate layer 22b and an outer layer 23b, and the connecting portion 3b includes a slit ring 5b and an hexagonal portion 53b, as in the coupling 1 shown in FIG. 1. The pipe coupling 15 operates as in the coupling 1.

Figure 5:
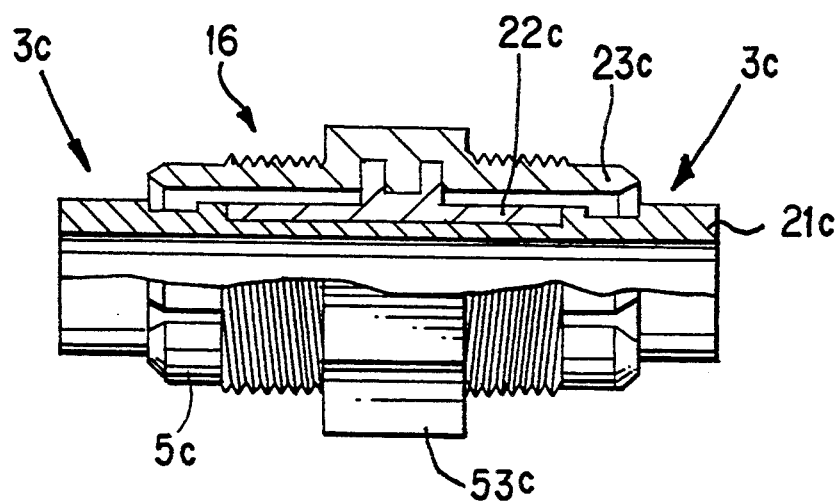
FIG. 5 is a partially cut side view for showing a fourth embodiment of a socket type pipe coupling of the present invention.

FIG. 5 shows a socket type pipe coupling 16 having two connecting portions 3c arranged linearly. The coupling 16 is formed of an inner layer 21c, an intermediate layer 22c and an outer layer 23c, and the connecting portion 3c includes a slit ring 5c and a hexagonal portion 53c, as in the coupling 1 shown in FIG. 1. The pipe coupling 16 operates as in the coupling 1.

The present invention is explained further with reference to the actual examples and comparative examples.

EXAMPLE 1

The coupling 1 shown in FIG. 1 was formed. The inner layer 21 was made of polyether ether ketone ("VICTREX" 450G produced by ICI Company, having a melt viscosity of 4,500 poise at 380° C. and shear rate of 1,000 sec$^{-1}$), and the intermediate layer 22 was made of polyether imide ("ULTEM" 2310 produced by GE Plastics Co.) containing 30% by weight of glass fibers with an average fiber diameter of 13 micro meter and an average fiber length of 300 micro meter. The outer layer 23 was made of polyamide 66 ("ZYTEL" 408HS produced by E. I. Du Pont de Nemous and Company with tensile elongation of 200% and Izod impact value of 100 J/m).

First, the intermediate layer 22 was molded by a mold for the intermediate layer, then the intermediate layer 22 was inserted into a mold for the inner layer to form the inner layer 21, and the formed product comprising the intermediate layer 22 and the inner layer 21 was inserted into a mold for the outer layer and subjected to injection molding to form integrally. The thicknesses of the inner layer 21, intermediate layer 22 and outer layer 23 at an X portion are 2 mm, 4 mm and 4 mm, respectively. Forming conditions of the respective layers are shown in Table 1.

TABLE 1

|  | Inner Layer Polyether ether ketone | Intermediate Layer Polyether imide (contain GF) | Outer Layer Polyamide 66 |
| --- | --- | --- | --- |
| Mold Temp. °C. | 150 | 130 | 60 |
| Melt Temp. °C. | 370 | 360 | 270 |
| Injection Pres. kg/cm$^2$ | 1,500 | 1,600 | 1,500 |

Figure 6:
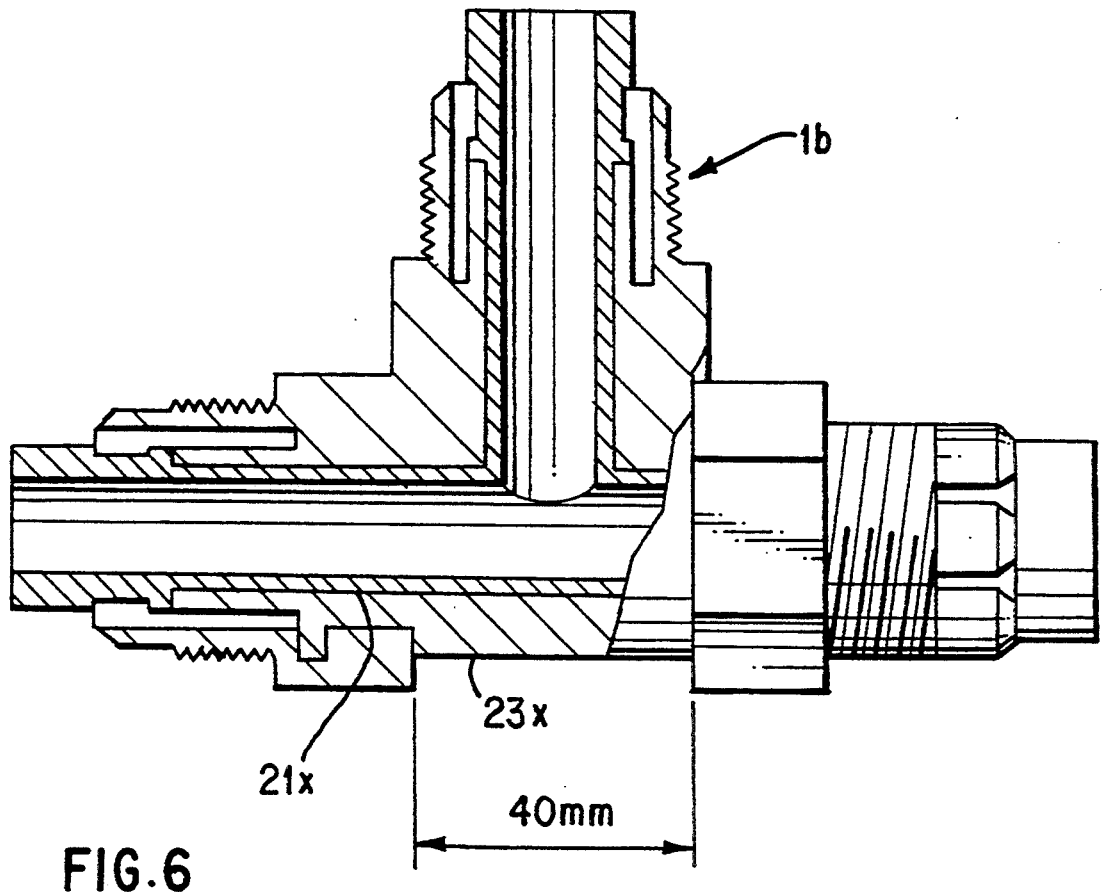
FIG. 6 is a partially cut side view for showing a conventional pipe coupling.
Figure 7:
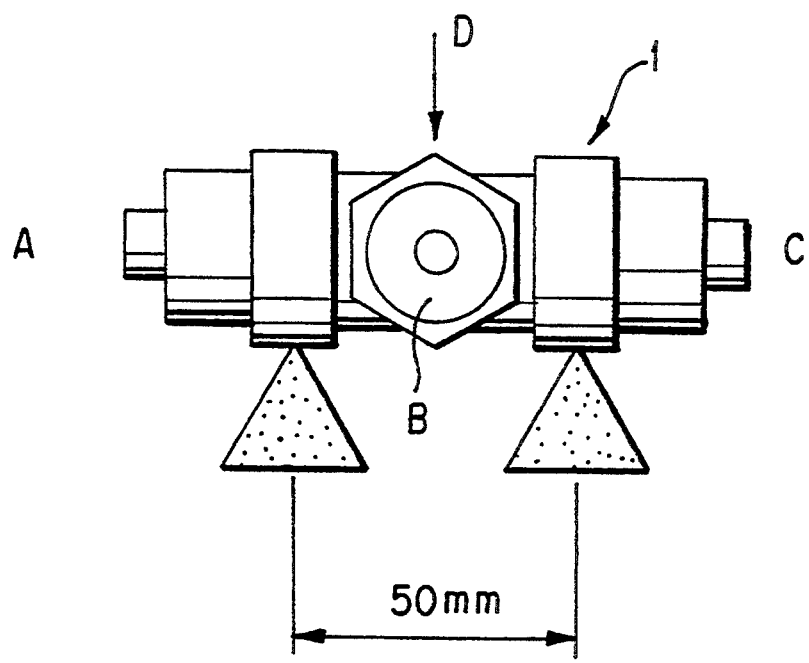
FIG. 7 is an explanation view for showing a method of a bending test.

The thus obtained coupling 1 was subjected to a bending test, as shown in FIG. 7, under a condition that the coupling 1 was supported at portions where a wrench was applied at an interval of 50 mm, at a room temperature of 25° C. A load as shown in an arrow D was applied at a rate of 1 mm/min in the central portion. As a result, a load-displacement curve as shown by a dotted line in FIG. 8 was obtained, and any unusual phenomenon was not observed in the vicinity of a load of 1,000 kg where cracks occurred in a conventional two layer coupling (refer to FIG. 6 and comparative example 1).

Also, the coupling 1 supported at the same condition as that of the bending test was subjected to a falling-ball impact test at a room temperature of 20° C., and an iron ball of 1 kg was dropped onto the central part of the coupling 1 from a height of every 50 cm. The coupling 1 was not cracked even when the iron ball was dropped from a height of 200 cm.

EXAMPLE 2

A coupling 1 was formed by the same molding method as that of example 1 except that the intermediate layer 22 was formed of polyphenylene sulfide ("FORTRON" 6465 produced by Polyplastic Co., Ltd.) containing 30% by weight of glass fibers with an average fiber diameter of 13 micro meter and an average fiber length of 300 micro meter. The intermediate layer 22 was formed at a mold temperature of 120° C., a melt temperature of 320° C. and an injection pressure of 1300 kg/cm$^2$.

Figure 9:
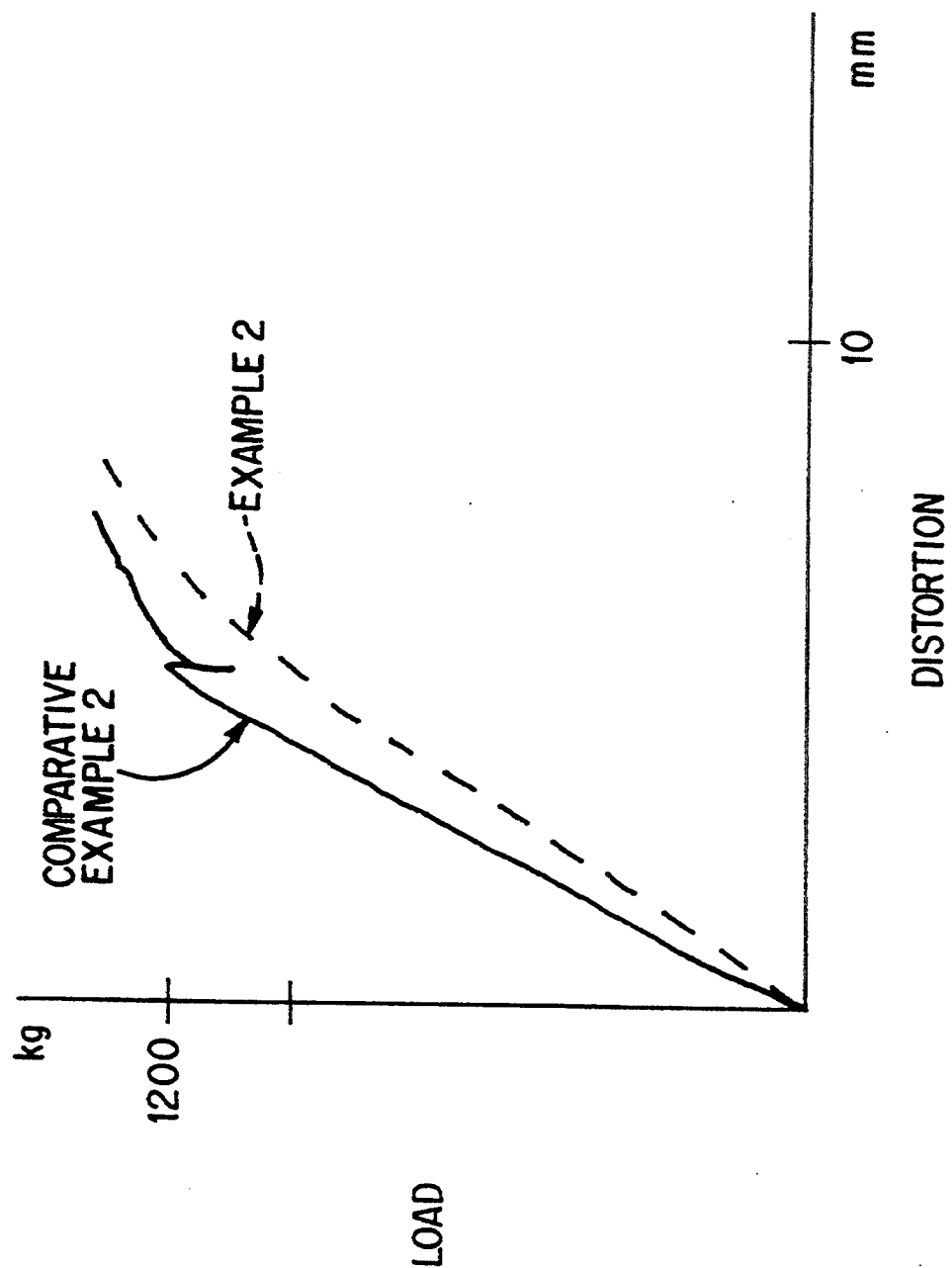
FIG. 9 is a graph for showing load-displacement curves of the bending tests on the coupling of example 2 and comparative example 2.

The thus obtained coupling 1 was subjected to the same bending test as that of example 1, and a load-displacement curve as shown by a dotted line in FIG. 9 was obtained. Any unusual phenomenon was not observed in the vicinity of a load of 1,200 kg where cracks occurred in a conventional two layer coupling (Refer to FIG. 6 and comparative example 2).

Also, the coupling 1 was subjected to the same falling-ball impact test as that of example 1, and was not cracked even when the iron ball was dropped from a height of 200 cm.

COMPARATIVE EXAMPLE 1

A coupling 1b of comparative example 1 was formed of only two layers, i.e. an inner layer 21x and an outer layer 23x of the same materials as those of example 1, without an intermediate layer as shown in FIG. 6. The coupling 1b having the same inner layer thickness of 2 mm and the same total thickness of 10 mm as those of the coupling 1 of example 1 was produced under the same molding condition and by the same method as those of example 1.

Figure 8:
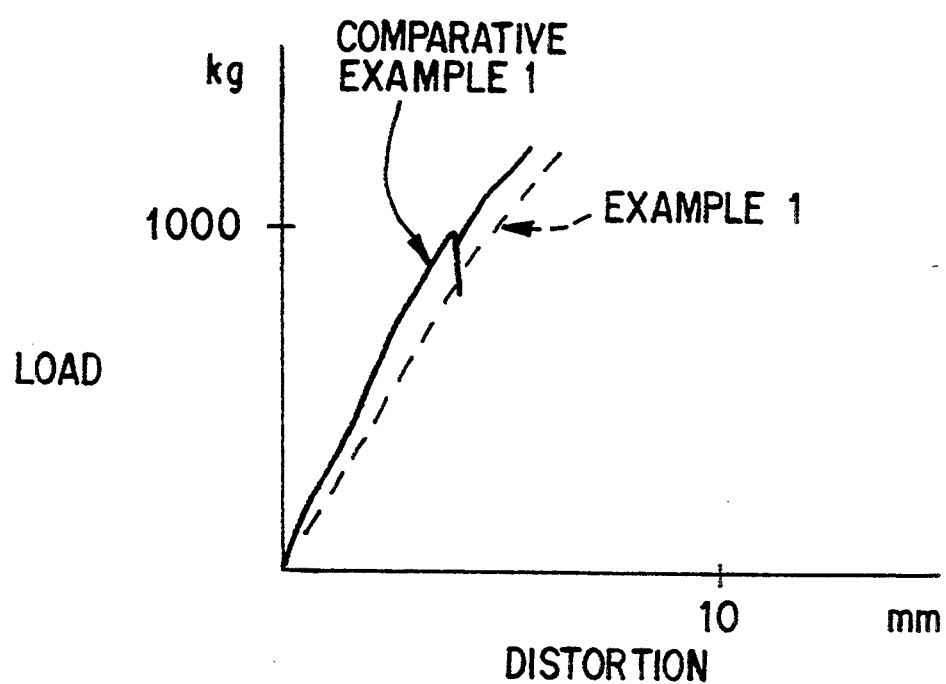
FIG. 8 is a graph for showing load-displacement curves of the bending tests on the coupling of example 1 and comparative example 1.

The obtained coupling 1b was subjected to the same bending test as that carried out in example 1, and as a result, a load-displacement curved line as shown in FIG. 8 was obtained. Cracks were observed in the vicinity of a load of 1,000 kg.

Also, the same ball-falling impact test as in example 1 was carried out, and the coupling 1b was cracked when the ball was dropped from a height of 150 cm.

COMPARATIVE EXAMPLE 2

A coupling of comparative example 2 was formed of only the inner layer and the outer layer of the same materials as those of example 2 without an intermediate layer. The coupling having the inner layer thickness of 2 mm and total thickness of 10 mm as in the coupling 1b of comparative example 1 was produced under the same condition and method as those of example 2.

The obtained coupling was subjected to the same bending test as that carried out in example 1, and as a result, a load-displacement curved line as shown in FIG. 9 was obtained. Cracks were observed in the vicinity of a load of 1,200 kg.

Further, the same ball-falling impact test as in example 1 was carried out, and the coupling was cracked when the ball was dropped from a height of 100 cm.

The results of Examples 1, 2 and Comparative Examples 1, 2 are shown in Table 2.

TABLE 2

| Height of falling ball | Example 1 | Example 2 | Comparative Example 1 | Comparative Example 2 |
|---|---|---|---|---|
| 50 | O | O | O | O |
| 100 | O | O | O | crack |
| 150 | O | O | crack | crack |
| 200 | O | O | crack | crack |

O: No crack

It is apparent from the above description that the pipe coupling of the present invention has excellent heat resisting property and chemical resistance as well as excellent pressure resisting strength, shear strength at the thread portion and impact strength. Even if pressure of fluid and impact, such as bending, dropping or hitting, are applied to the pipe coupling of the present invention, the pipe coupling is not cracked or broken, and even if a nut or machinery and tools are inserted into the pipe coupling, the thread portion is not damaged.

Further, the coupling main body and the slit ring are formed integrally, so that when the pipe coupling is connected to a pipe, a separate slit ring is not required, and pipe joining work is carried out easily. Also, the pipe coupling can be easily stored and transported.

What is claimed is:

1. A pipe fitting comprising:
   an elongated hollow inner layer formed of a thermoplastic resin, and having inner and outer circumferential surfaces, and first and second ends,
   an intermediate layer formed on the outer surface of said inner layer and extending from a portion near the first end at a predetermined distance away from the first end toward said second end, said intermediate layer being formed of a thermoplastic resin and containing reinforcing fibers therein for reinforcement, said intermediate layer having first and second circular portions and a center portion situated between the first and second circular portions, said center portion having a hexagonal shape with apexes and side faces and projecting outwardly from the first and second circular portions in a direction away from the inner layer, said center portion having slits transversely crossing the apexes of the hexagonal shape and holes in the side faces, and
   an outer layer situated on the intermediate layer and formed of a thermoplastic resin having a tensile elongation of 10–1,000% and Izod impact value of 50–1,000 J.m$^{-1}$ said outer layer filling the slits and the holes to cover substantially the entire intermediate layer and extending over at least a part of the inner layer at a side of the first end to form an insertion portion for a pipe to be connected to the pipe coupling, said insertion portion being defined by an inner surface of an axially extending outer portion of the outer layer and by a part of the inner layer and the first circular portion of the intermediate layer outside the center portion thereof, said outer portion having a plurality of slits and threads to constitute a slit ring, said outer layer having a middle portion adjacent the outer portion, said middle portion being located radially outside of the center portion of the intermediate layer and having a hexagonal shape and the outer layer being immovably laminated over the intermediate layer in circumferential and longitudinal directions.

2. A pipe fitting according to claim 1, wherein said thermoplastic resin for forming the inner layer contains polyether ether ketone as a main component.

3. A pipe fitting according to claim 1, wherein said inner, intermediate and outer layers extend in a T-shape having three connecting portions, each connecting portion having the first and second circular portions and the center portion in the intermediate layer, and the outer and middle portions in the outer layer so that three pipes are connected to the respective connecting portions.

4. A pipe fitting according to claim 1, wherein said outer layer further includes a valve connection portion with external threads located at a side opposite to the outer portion and over the second circular portion of the intermediate layer.

5. A pipe fitting according to claim 1, wherein said inner, intermediate and outer layers have two connecting portions, each connecting portion having the first and second circular portions and the center portion in the intermediate layer, and the outer and middle portions in the outer layer so that two pipes are connected to the respective connecting portions.

6. A pipe fitting according to claim 1, wherein said second circular portion in the intermediate layer is formed as in the first circular portion symmetrically to the center portion and is located over the second end of the inner layer, said outer layer further including a second outer portion adjacent the middle portion and situated over the inner and intermediate layers.

* * * * *